United States Patent [19]

Lauterbach

[11] 4,214,478
[45] Jul. 29, 1980

[54] SYSTEM AND METHOD FOR ELIMINATING ERRORS IN AIRFLOW MEASUREMENT APPARATUS

[75] Inventor: Heinz Lauterbach, Esslingen, Fed. Rep. of Germany

[73] Assignee: Robert Bosch GmbH, Stuttgart, Fed. Rep. of Germany

[21] Appl. No.: 946,966

[22] Filed: Sep. 29, 1978

[30] Foreign Application Priority Data

Nov. 16, 1977 [DE] Fed. Rep. of Germany ....... 2751196

[51] Int. Cl.³ .............................................. G01F 1/68
[52] U.S. Cl. ..................................................... 73/204
[58] Field of Search ...................................... 73/204

[56] References Cited
U.S. PATENT DOCUMENTS

| | | | |
|---|---|---|---|
| 3,352,154 | 11/1967 | Djorup | 73/204 |
| 3,603,147 | 9/1971 | Dorman | 73/204 |
| 3,604,261 | 9/1971 | Olin | 73/204 |
| 3,648,518 | 3/1972 | Ranier et al. | 73/204 |
| 3,942,378 | 3/1976 | Olmstead | 73/204 |
| 3,992,940 | 11/1976 | Platzer, Jr. | 73/204 |

OTHER PUBLICATIONS

Olin "Split-Film Anemometer Sensors" in Instruments and Control Systems vol. 3#6 6/70.

*Primary Examiner*—Herbert Goldstein
*Attorney, Agent, or Firm*—Frishauf, Holtz, Goodman & Woodward

[57] ABSTRACT

Airflow measuring apparatus utilizes a temperature-varying resistance layer on a carrier as a sensor. The resistance and temperature of the temperature-varying resistance layer are maintained substantially constant by a regulator circuit, independent of the amount of cooling by air flowing past the element. To minimize errors resulting from heating and cooling of the carrier, the surface of the carrier which does not have the temperature-varying resistance element is covered by a temperature-independent resistance layer and the current through the temperature independent resistance layer is controlled such that the temperature independent resistance layer is at substantially the same temperature as the temperature-varying resistance layer. Thus thermal gradients in the carrier are eliminated.

10 Claims, 3 Drawing Figures

SYSTEM AND METHOD FOR ELIMINATING ERRORS IN AIRFLOW MEASUREMENT APPARATUS

The present invention relates to airflow measuring apparatus and, in particular, to airflow measuring apparatus measuring the quantity of air in the air intake of an internal combustion engine.

BACKGROUND AND PRIOR ART

Apparatus is known in which the sensing element for airflow measuring apparatus is a temperature-varying resistance layer deposited on a carrier. A disadvantage of this arrangement is that because of its mass, the carrier has a certain thermal capacity which cannot be neglected. Thus the carrier transmits heat from the surfaces not carrying the temperature-varying resistance layer to the surroundings. This heat originates internally of the carrier. Therefore a temperature gradient is created within the carrier. When the thermal equilibrium of the carrier is disturbed by changes of the quantity of air flowing past the carrier, the carrier must be either heated or cooled. Until the carrier has adjusted to the new conditions a predetermined time elapses, that is a delay is introduced into measurement.

THE INVENTION

It is an object of the present invention to eliminate the above-mentioned difficulty. In accordance with the present invention, the carrier is heated to a carrier temperature which corresponds to the normal operating temperature of the temperature-varying resistance sensor layer. Most specifically, a second layer, electrically isolated from the first layer, is on the carrier and serves as heating resistor for the carrier. Since substantially all surfaces of the carrier are maintained at substantially the same temperature throughout the measurement, the interior of the carrier will remain at a substantially constant temperature. After an initial start-up time, the sensor will therefor react very rapidly and precisely to deviations from the carrier temperature.

Further in accordance with the present invention, the temperature-varying resistance layer is positioned in the airflow in such a manner that the dirt deposited thereon is minimized.

The sensor can be part of a measuring system described in detail in U.S. Ser. No. 944,587, filed Sept. 21, 1978, Peter, assigned to the assignee of this application.

DRAWINGS ILLUSTRATING PREFERRED EMBODIMENTS

In airflow measuring apparatus in which the temperature-varying resistance is a film or a layer on a carrier, the sensitivity in general depends on the thermal capacity of the carrier. The effect of the thermal capacity of the carrier is to be eliminated by keeping the temperature of the carrier at least substantially constant at the same operating temperature as the temperature-varying resistance layer constituting the sensing element.

Figure 1:
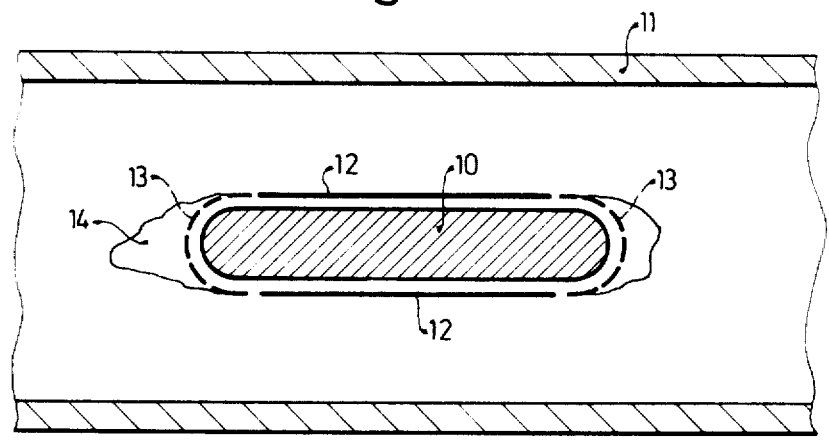
FIG. 1 shows a first embodiment of a carrier having a first layer constituting a sensing element for airflow measuring apparatus and a second layer constituting a heating element for the carrier.

In FIG. 1 an oval carrier 10 is shown which is arranged in the intake pipe 11 of an internal combustion engine. Substantially the whole surface of the carrier is coated. The coating includes layers 12 and 13 which are electrically insulated from each other. Both layers are to be regulated to substantially the same temperature. Layer 13 is utilized for heating of carrier 10, while layer 12 constitutes a temperature-varying resistance sensor. The latter forms part of a bridge circuit and is controlled to a substantially constant operating temperature by a regulator circuit 16. The current flowing through temperature-varying resistance layer 12 at any time is a measure of the amount of air flowing past the layer.

Preferably layer 13, which constitutes the heating resistor for the carrier, is positioned in such a way that any dirt deposited by the air or other gas flowing past the apparatus will be deposited thereon rather than on the temperature-varying resistance sensor layer 12. The fact that temperature-varying resistance sensor layer 12 is positioned in such a manner that substantially no undesired deposits are formed thereon also increases the reliability and accuracy of the apparatus. The calibrated values are not affected by dirt and the full sensitivity of the apparatus can be maintained even when dirt is deposited, since the dirt is deposited almost exclusively on the layer 13 constituting the heating resistor.

Figure 2:
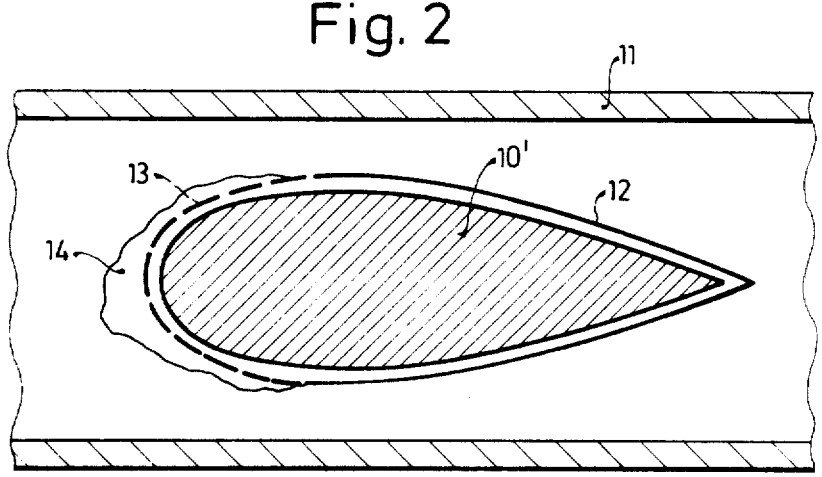
FIG. 2 shows a second embodiment of the carrier and sensing and heating element layer of FIG. 1.

In FIG. 2, the carrier 10 has a streamlined shape and, again, is located in the intake pipe 11 of an internal combustion engine. The part of the carrier which is upstream in the direction of airflow carries the lauer 13 which constitutes the heating resistor. The downstream portion carries the layer 12 which constitutes the temperature-varying resistance sensor. Again, layers 12 and 13 are electrically insulated from each other. As in FIG. 1, those regions of the surface of the carrier which are particularly subjected to dirt deposits from the air or other gas flowing past carry the heating resistance layer 13 while those shielded from the dirt carry the temperature-varying resistance sensor layer 12. A dirt deposit is designated by reference numeral 14.

Figure 3:
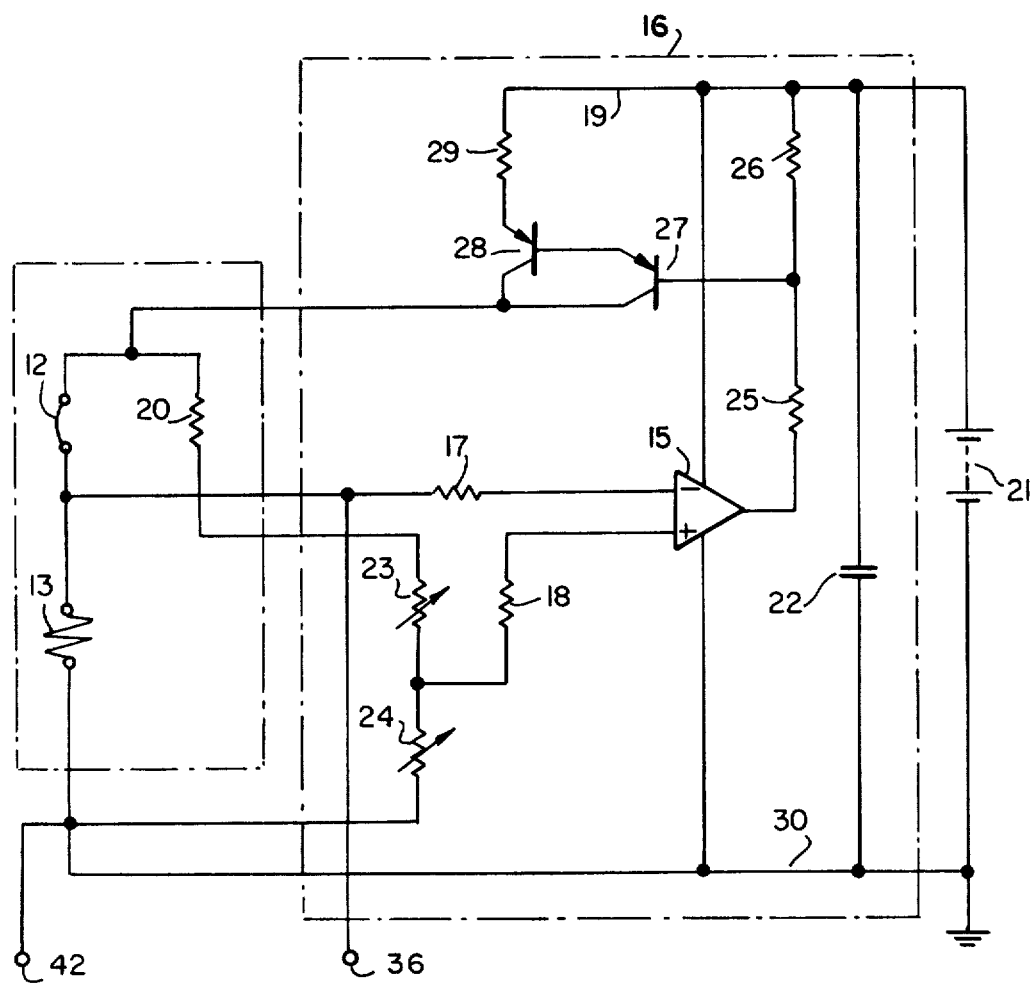
FIG. 3 is a schematic diagram of the current regulator circuit for the sensing and heating layers of FIGS. 1 and 2.

In FIG. 3 a bridge circuit includes a temperature-varying resistor 20 located remotely from the airflow to provide for ambient air temperature change compensation, a resistor 12 which represents the temperature-varying air-flow sensing resistance layer on the carrier, resistor 13 symbolizing the heating resistor layer on carrier 10, a variable resistor 23, and a variable resistor 24. An operational amplifier 15 has an inverting input connected through a resistor 17 to the common point of resistors 12 and 13 and a direct input-connected through a resistor 18 to the common point of resistors 23 and 24. The energization of operational amplifier 15 is supplied by supply lines 19, 30 which are connected to a DC voltage supply 21. The output of operational amplifier 15 is connected through a series circuit including resistor 25 and a resistor 26 to line 19. The common point of resistor 25 and 26 is connected to the base of a transistor 27 which forms part of a Darlington circuit also including a transistor 28. The emitter of transistor 28 is connected through a resistor 29 to line 19.

The operation of the regulator circuit of FIG. 3 is discussed in detail in the referenced application Ser. No. 944,587, Peter. However, it should be briefly noted that the output voltage of operational amplifier 15 varies as a function of the degree of unbalance of the bridge circuit. This output voltage is applied to the Darlington stage of transistor 27 and 28 which, together with resistor 29, constitutes a constant current source. The current furnished by the constant current source to the bridge circuit varies as a function of the voltage applied to it and therefor as a function of the unbalance of the bridge circuit and in such a direction as to restore the bridge circuit balance. The current through resistors 12 and 13 which is required to rebalanced the bridge circuit, that is to keep resistor 12 at its normal operating resistance and temperature, therefore varies as a function of the quantity of air flowing past layer 12. This is the desired measurement signal. It can be derived from terminals 36 and 42. It will be noted that, since the same current flows through resistors 12 and 13, if these resistors have substantially the same resistance value, all the surfaces of the carrier will be at substantially the same temperature.

Various changes and modifications may be made within the inventive concept.

I claim:

1. In airflow measuring apparatus having a support carrier (10, 10') located in said airflow, a temperature-varying resistance sensor layer (12) on said carrier and supported thereby whereby the resistance sensor layer (12) will be in thermal transfer relation with respect to both said airflow and said carrier, and regulator means (16) for varying the current through said temperature-varying resistance sensor layer in such a manner that the temperature, and hence resistance of said temperature-varying resistance sensor layer remains substantially constant at a predetermined operating temperature, independent of the amount of airflow therealong, the improvement comprising a substantially temperature independent heating means (13) positioned in heat-conductive relation with respect to said support carrier (10, 10') and electrically insulated from the temperature-varying resistance sensor layer (12) on said carrier to heat said carrier to a carrier temperature corresponding to said operating temperature, whereby errors in measurement resulting from heating and cooling of said carrier are substantially decreased.

2. Apparatus as set forth in claim 1, wherein said temperature-varying resistance sensor layer (12) constitutes a first layer; and wherein said heating means (13) comprises a second layer on said carrier and constituting a heating resistor (13) for said support carrier (10, 10').

3. Apparatus as set forth in claim 2, wherein said regulator means further comprises circuit means for controlling current flow through said heating resistor (13) for regulating the temperature of said support carrier (10, 10') to a carrier temperature corresponding to said predetermined operating temperature of said temperature-varying resistance layer (12).

4. Apparatus as set forth in claim 1, wherein said regulator means comprises a bridge circuit, and a bridge current supply circuit, said bridge circuit comprises a first arm including, in series connection, said temperature-varying resistance layer (12), a measuring junction, and a heating resistor (13) forming said heating means, and a second arm including, in series connection, a temperature reference resistor (20), a reference junction, and reference resistor means (23, 24);

and said bridge current supply circuit comprises comparator means (15, 17, 18) connected to said measuring junction and said reference junction, respectively, and providing a comparison signal, and controlled current supply means (27, 28) connected across both said bridge arms and providing a controlled current in accordance with said comparison signal.

5. Apparatus as set forth in claim 1, wherein said support carrier (10, 10') is positioned in said airflow in such a manner that deposit of dirt on said temperature-varying resistance layer (12) is minimized.

6. Apparatus as set forth in claim 5, wherein the support carrier (10, 10') is an elongated, essentially streamlined body;

and said second layer forming the heating resistor (13) comprises a layer of resistance material located at least at one end portion of the body, the first layer forming the temperature-varying resistance layer (12) being located along the sides of the body, downstream, in the direction of airflow, from said heating resistor (13) to be protected against accumulation of contaminating deposits (14) thereon by said second layer forming the heating resistor.

7. Apparatus as set forth in claim 6, wherein said support carrier body (10) is, in longitudinal cross section, of elongated, oval shape, and said second layer forming the heating resistor (13) is applied in two layer section at each end portion of the support carrier body to protect the temperature-varying resistance layer (12) upon flow of air in either direction.

8. Apparatus as set forth in claim 6, wherein said regulator means (16) is connected to commonly control current flow through said heating resistor (13) and through said temperature-varying resistance layer (12) under sensing control of the resistance of the temperature-varying resistance layer.

9. In airflow measuring apparatus having a sensing element comprising a support carrier (10, 10'), a temperature-varying resistance sensor layer (12) positioned on said carrier, and hence in thermal transfer relation thereto, and regulator means (16) for maintaining said temperature-varying resistance layer at a substantially constant operating temperature independent of cooling by air flowing thereby, a method for minimizing measurement errors resulting from the thermal capacity of said carrier, comprising the step of heating said carrier by a substantially temperature independent heating means to a carrier temperature corresponding to said predetermined operating temperature of said temperature-varying resistance layer separately with respect to heat derived from the temperature-varying resistance sensor layer (12).

10. The method of claim 9, wherein the step of heating the carrier (10, 10') comprises passing current through an electrical resistance layer (13) positioned on the carrier and in heat-conductive relationship thereto at a rate controlled by the airflow past said carrier, as sensed by said temperature-varying resistance sensor layer (12).

* * * * *